United States Patent
Miyagawa et al.

(10) Patent No.: US 8,305,674 B2
(45) Date of Patent: Nov. 6, 2012

(54) METHOD OF MANUFACTURING OSCILLATOR DEVICE, AND OPTICAL DEFLECTOR AND OPTICAL INSTRUMENT WITH OSCILLATOR DEVICE BASED ON IT

(75) Inventors: Suguru Miyagawa, Tokyo (JP); Takahiro Akiyama, Kawasaki (JP); Kazutoshi Torashima, Yokohama (JP); Takahisa Kato, Tokyo (JP); Kazunari Fujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 12/673,694

(22) PCT Filed: Oct. 28, 2008

(86) PCT No.: PCT/JP2008/069996
§ 371 (c)(1),
(2), (4) Date: Feb. 16, 2010

(87) PCT Pub. No.: WO2009/057801
PCT Pub. Date: May 7, 2009

(65) Prior Publication Data
US 2011/0019256 A1    Jan. 27, 2011

(30) Foreign Application Priority Data

Oct. 30, 2007 (JP) ................................ 2007-281209
May 28, 2008 (JP) ................................ 2008-139695

(51) Int. Cl.
*G02B 26/10* (2006.01)
(52) U.S. Cl. .................................... 359/224.1; 359/904
(58) Field of Classification Search .... 359/197.1–199.4, 359/200.6–200.8, 224.1, 904
See application file for complete search history.

(56) References Cited

U.S. PATENT DOCUMENTS
6,256,131 B1    7/2001    Wine et al.
(Continued)

FOREIGN PATENT DOCUMENTS
EP    1 708 004 A1    10/2006
(Continued)

OTHER PUBLICATIONS

Feb. 25, 2009 International Search Report and Written Opinion in International Appln. No. PCT/JP2008/069996.

*Primary Examiner* — Jennifer L. Doak
(74) *Attorney, Agent, or Firm* — Fitzpatrick, Cella, Harper & Scinto (57) ABSTRACT

A method of manufacturing an oscillator device having an oscillator supported relative to a fixed member by a torsion spring for oscillation around a torsion axis and arranged to be driven at a resonance frequency, which method includes a first step for determining an assumed value of an inertia moment weight of the oscillator, a second step for measuring the resonance frequency, a third step for calculating a spring constant of the torsion spring, from the assumed value of the inertia moment weight and the measured resonance frequency obtained at said first and second steps, a fourth step for calculating an adjustment amount for the inertia moment of the oscillator or for the spring constant of the torsion spring, based on the spring constant calculated at said third step and a target resonance frequency determined with respect to the resonance frequency of the oscillator, so as to adjust the resonance frequency to the target resonance frequency, and a fifth step for adjusting the resonance frequency of the oscillator to the target resonance frequency based on the calculated adjustment amount.

10 Claims, 9 Drawing Sheets

U.S. PATENT DOCUMENTS

| | | |
|---|---|---|
| 7,196,830 B2 | 3/2007 | Torashima et al. |
| 7,548,362 B2 | 6/2009 | Miyagawa et al. |
| 7,656,570 B2 * | 2/2010 | Torashima et al. ........ 359/224.1 |
| 2005/0243396 A1 * | 11/2005 | Fujii et al. .................... 359/224 |
| 2006/0132883 A1 | 6/2006 | Saitoh |
| 2007/0180672 A1 | 8/2007 | Murakami et al. |
| 2007/0279720 A1 * | 12/2007 | Torashima et al. ........... 359/199 |
| 2008/0165403 A1 * | 7/2008 | Grasshoff et al. ............. 359/199 |
| 2011/0019256 A1 * | 1/2011 | Miyagawa et al. ........ 359/213.1 |
| 2011/0116145 A1 * | 5/2011 | Fujii et al. ................... 359/197.1 |

FOREIGN PATENT DOCUMENTS

| | | |
|---|---|---|
| JP | 2002-40355 A | 2/2002 |

\* cited by examiner

METHOD OF MANUFACTURING OSCILLATOR DEVICE, AND OPTICAL DEFLECTOR AND OPTICAL INSTRUMENT WITH OSCILLATOR DEVICE BASED ON IT

TECHNICAL FIELD

This invention relates to a method of manufacturing an oscillator device, and an optical deflector and optical instrument comprised of an oscillator device manufactured by the manufacturing method. More specifically, the invention concerns a technique which enables an oscillator device suitably usable in various optical instruments including, for example, a projection display for projecting an image based on the scanning deflection of light, and an image forming apparatus such as a laser beam printer, a digital copying machine and so on having an electrophotographic process.

BACKGROUND ART

In recent years, various proposals have been made with regard to optical scanning systems (and optical scanning devices) arranged as an optical deflector to perform sinusoidal vibration based on a resonance phenomenon.

In the optical deflectors using such resonance phenomenon, there is a certain resonance frequency determined as a targeted frequency of eigenmode relative to a desired driving frequency is determined (hereinafter, this resonance frequency will be referred to as "resonance frequency"). Several proposals have been made in regard to the method of manufacturing such optical deflectors using the resonance phenomenon.

Figure 11:
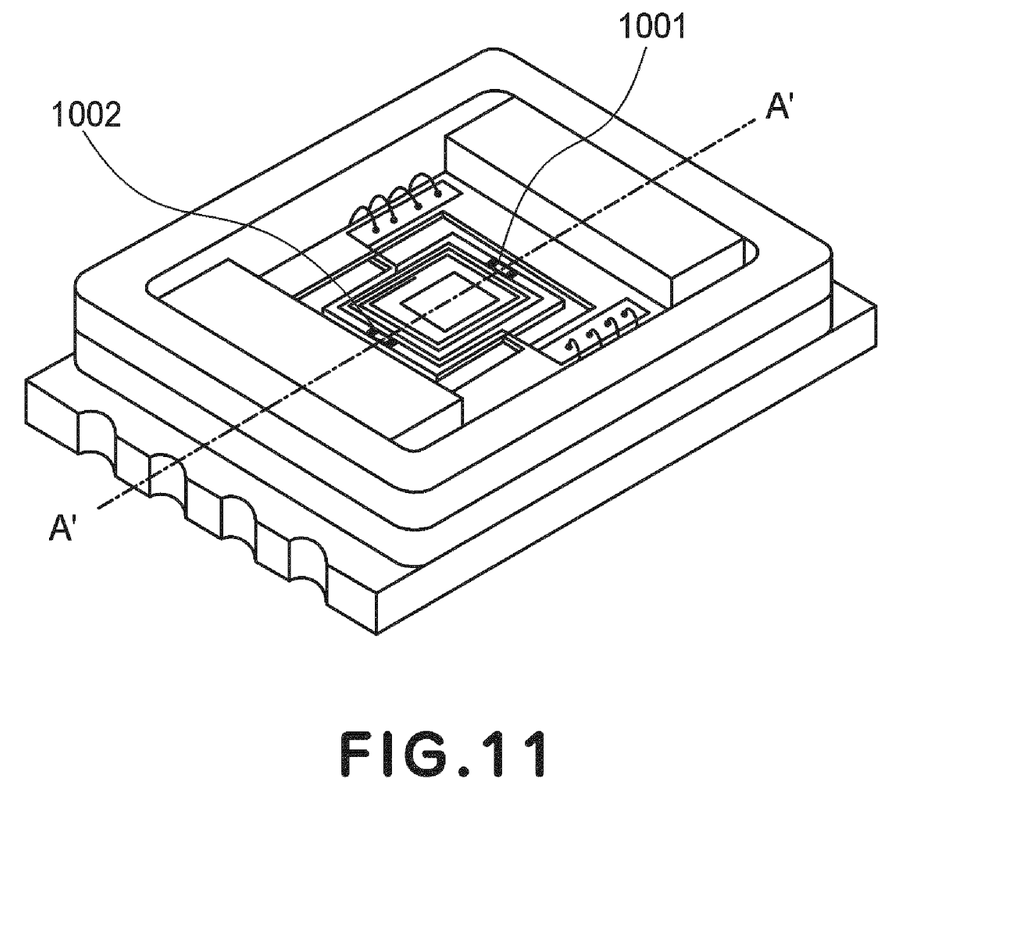
FIG. 11 is a perspective view for explaining the structure of a conventional optical deflector.

Among them, Japanese Laid-Open Patent Application No. 2002-40355 discloses a technique concerning a method of manufacturing an oscillator device such as shown in FIG. 11.

In FIG. 11, there are mass loading members 1001 and 1002 which are formed at opposite ends of an oscillator having a reflection surface and an electric coil and supported by torsion springs around a torsion axis. When the resonance frequency of the oscillator is going to be adjusted, a weight (mass) is removed by irradiating a laser beam to the aforementioned mass loading members 1001 and 1002 to adjust the inertia moment weight, thereby to set the resonance frequency at a desired value.

Here, the amount of weight removal from the mass loading members 1001 and 1002 is determined based on the relationship between the number of laser irradiations and the amount of change of the resonance frequency having been inputted beforehand.

DISCLOSURE OF THE INVENTION

By the way, in the manufacturing process of an oscillator and a torsion spring which constitute the oscillator device, an error may occur when a wafer is processed, causing dispersion of the spring constant and the inertia moment of the oscillator device. Here, since the resonance frequency of the oscillator device is determined by the inertia moment of the oscillator and the spring constant of the torsion spring, a finishing error in the manufacturing process such as described above will cause dispersion of the resonance frequency of the oscillator device.

In the aforementioned Japanese Laid-Open Patent Application No. 2002-40355, the amount of weight removal from the mass loading members 1001 and 1002 is determined based on the relationship between the number of laser irradiations and the amount of change of the resonance frequency, having been inputted previously.

However, if there is a finishing error in the manufacturing process, it means that finishing errors have occurred in the oscillator and the torsion spring. Thus, in that occasion, it is necessary to acquire the relationship between the number of laser irradiations and the amount of change of the resonance frequency, corresponding to these dispersions. Therefore, an enormous table is necessitated.

Furthermore, although the resonance frequency may be slowly adjusted to a target frequency by, for example, alternately repeating the removal of the inertia moment of the oscillator and the measurement of the resonance frequency, in this approach the adjustment of the resonance frequency of the oscillator device takes long time.

The present invention provides a method of manufacturing an oscillator device by which, even when there is a finishing error in the manufacturing process of an oscillator and a torsion spring constituting the oscillator device, the resonance frequency can be adjusted quickly and highly precisely.

The present invention in another aspect provides an optical deflector or an optical instrument which is comprised of an oscillator device manufactured by the aforementioned manufacturing method.

Specifically, in accordance with an aspect of the present invention, there is provided a method of manufacturing an oscillator device having an oscillator supported relative to a fixed member by a torsion spring for oscillation around a torsion axis and arranged to be driven at a resonance frequency, said method comprising: a first step for determining an assumed value of an inertia moment weight of the oscillator; a second step for measuring the resonance frequency; a third step for calculating a spring constant of the torsion spring, from the assumed value of the inertia moment weight and the measured resonance frequency obtained at said first and second steps; a fourth step for calculating an adjustment amount for the inertia moment of the oscillator or for the spring constant of the torsion spring, based on the spring constant calculated at said third step and a target resonance frequency determined with respect to the resonance frequency of the oscillator, so as to adjust the resonance frequency to the target resonance frequency; and a fifth step for adjusting the resonance frequency of the oscillator to the target resonance frequency based on the calculated adjustment amount.

In one preferred from of this aspect of the present invention, the torsion spring and the oscillator include two, first and second oscillators and two, first and second torsion springs, respectively, wherein, through said first to fourth steps, an inertia moment adjustment amount corresponding to the first and second oscillators or a spring constant adjustment amount corresponding to the first and second torsion springs is calculated.

The first and second oscillators may be adjusted to be able to oscillate around the torsion axis, based on a primary resonance frequency which is the target resonance frequency and a secondary resonance frequency having a frequency approximately twofold the target resonance frequency.

The assumed value of the inertia moment weight of the oscillator may be determined by at least one design value or by at least one design value and at least one measured value.

The oscillator, the torsion spring and the fixed member may be formed integrally by use of monocrystal silicon, wherein the at least one measured value may include at least one of measured values concerning (i) a thickness of the monocrystal silicon, (ii) a cross-sectional area of the oscillator perpendicular to the thickness direction of the monocrystal silicon, (iii) a length of a permanent magnet in a magnetization direction thereof, the permanent magnet being adhered to drive the oscillator formed by the monocrystal silicon, and (iv) a cross-sectional area of the permanent magnet perpendicular to the magnetization direction.

In accordance with another aspect of the present invention, there is provided a method of manufacturing an oscillator device having an oscillator supported relative to a fixed member by a torsion spring for oscillation around a torsion axis and arranged to be driven at a resonance frequency, said method comprising: a first step for determining an assumed value of a spring constant of the torsion spring; a second step for measuring the resonance frequency; a third step for calculating an inertia moment weight of the oscillator, from the assumed value of the spring constant of the torsion spring and the measured resonance frequency obtained at said first and second steps; a fourth step for calculating an adjustment amount for the inertia moment of the oscillator or for the spring constant of the torsion spring, based on the inertia moment weight of the oscillator calculated at said third step and a target resonance frequency determined with respect to the resonance frequency of the oscillator, so as to adjust the resonance frequency to the target resonance frequency; and a fifth step for adjusting the resonance frequency of the oscillator to the target resonance frequency based on the calculated adjustment amount.

In one preferred form of this aspect of the present invention, the torsion spring and the oscillator include two, first and second oscillators and two, first and second torsion springs, respectively, and wherein, through said first to fourth steps, an inertia moment adjustment amount corresponding to the first and second oscillators or a spring constant adjustment amount corresponding to the first and second torsion springs is calculated.

The first and second oscillators may be adjusted to be able to oscillate around the torsion axis, based on a primary resonance frequency which is the target resonance frequency and a secondary resonance frequency having a frequency approximately twofold the target resonance frequency.

The assumed value of the spring constant of the torsion spring may be determined by at least one design value or by at least one design value and at least one measured value.

The oscillator, the torsion spring and the fixed member may be formed integrally by use of monocrystal silicon, wherein the at least one measured value may include at least one of measured values concerning (i) a thickness of the monocrystal silicon, (ii) a length of the torsion spring in a direction perpendicular to the torsional axis, and (iii) a length of the torsion spring in a direction parallel to the torsional axis.

In accordance with a further aspect of the present invention, there is provided an optical deflector, comprising: an oscillator device manufactured in accordance with an oscillator device manufacturing method as recited above; and an optical deflecting element disposed on the oscillator of said oscillator device.

In accordance with a yet further aspect of the present invention, there is provided an optical instrument, comprising: a light source; a photosensitive member or an image display member; and an optical deflector as recited above, wherein said optical deflector is configured to deflect light from said light source so that at least a portion of the light is incident on said photosensitive member or said image display element.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2A and 2B are diagrams for explaining an oscillator device manufacturing method in the first embodiment of the present invention, wherein

FIGS. 4A and 4B are diagrams for explaining an oscillator device manufacturing method in a second embodiment of the present invention, wherein

FIGS. 6A-6C are diagrams for explaining an oscillator device manufacturing method in a third embodiment of the present invention, wherein

BEST MODE FOR PRACTICING THE INVENTION

The best mode for practicing the invention will be explained with reference to the following embodiments.

Embodiment 1

In the first embodiment, the present invention is applied to a method of manufacturing an oscillator device including an oscillator which is supported relative to a fixed member by a torsion spring for oscillation (torsional oscillation) around a torsion axis and is arranged to be driven at a resonance frequency.

Figure 1:
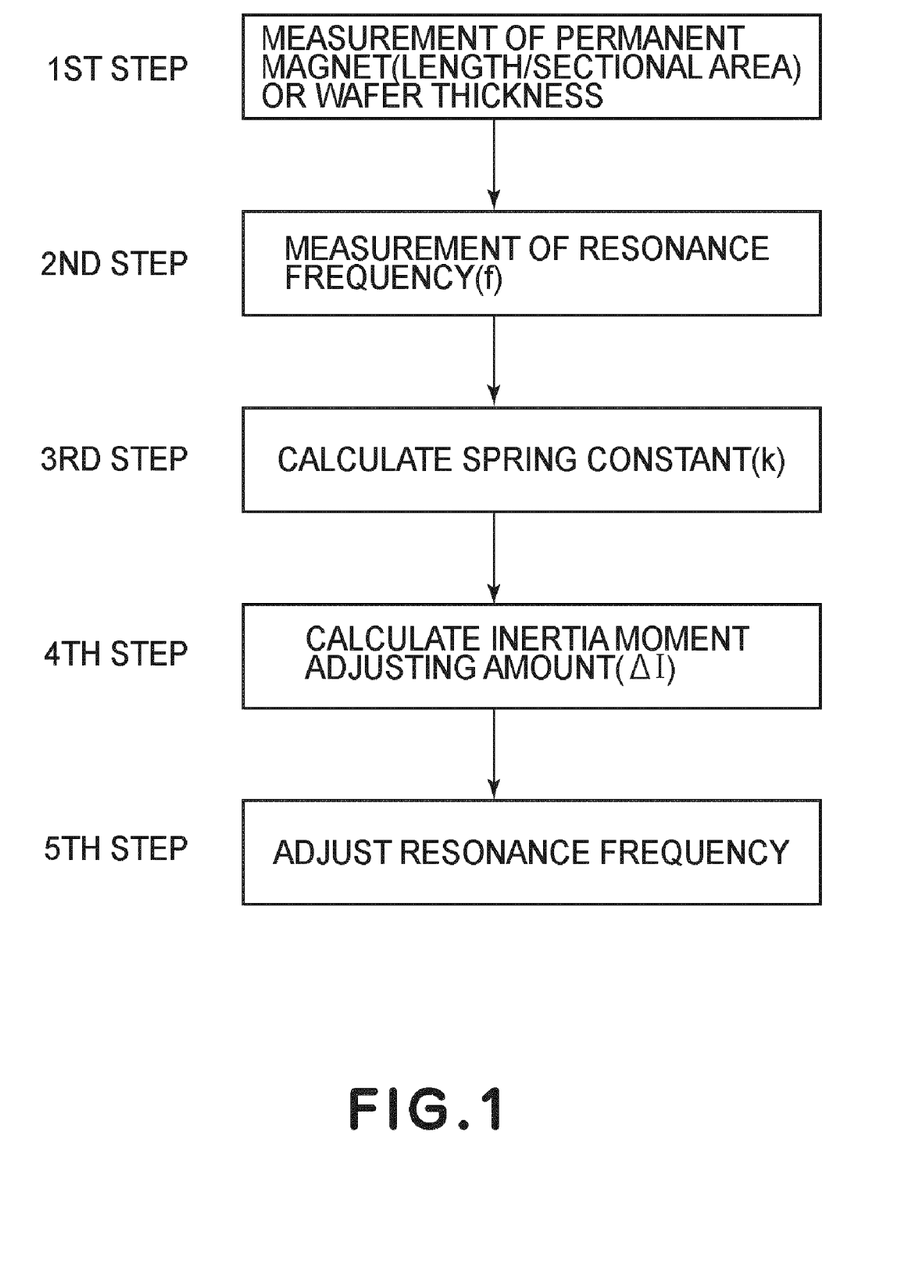
FIG. 1 is a flow chart for explaining a method of manufacturing an oscillator device in a first embodiment of the present invention.

FIG. 1 is a flow chart for explaining the oscillator device manufacturing method of the present embodiment.

Figure 2A:
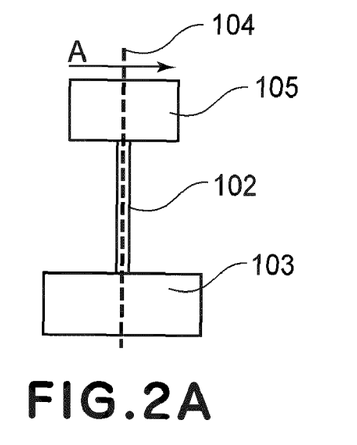
FIG. 2A is a front elevation of an oscillator device of the present embodiment.
Figure 2B:
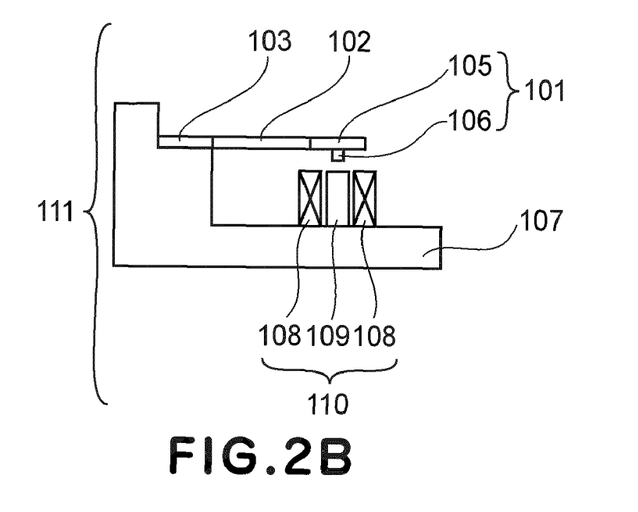
FIG. 2B is a sectional view along a plane passing through a torsion axis and being perpendicular to sheet of the drawing.

FIGS. 2A and 2B are diagrams for explaining the oscillator device manufacturing method of the present embodiment, wherein FIG. 2A is a front elevation of an oscillator device of the present embodiment, and FIG. 2B is a sectional view along a plane passing through a torsion axis 104 and being perpendicular to sheet of the drawing.

In FIGS. 2A and 2B, denoted at 101 is an oscillator, and denoted at 102 is a torsion spring. Dented at 103 is a fixed member, and denoted at 104 is a torsion axis. Denoted at 105 is a silicon member, and denoted at 106 is a permanent magnet. Denoted at 107 is a fixed base, and denoted at 108 is an electric coil. Denoted at 109 is a core, and denoted at 110 is an actuator. Denoted at 111 is an oscillator device.

In the oscillator device of the present embodiment, the oscillator 101 is supported at the fixed member 103 by means of the torsion spring 102. Furthermore, the fixed member 103 is supported by the fixed base 107.

The fixed member 103 and the silicon member 105 and the torsion spring 102 of the oscillator 101 are formed integrally, by processing a monocrystal silicon substrate in accordance with photolithography and dry etching of the semiconductor production method.

The oscillator 101 is comprised of a reflection surface (not shown), a silicon member 105 and a permanent magnet 106.

The material of the reflection surface is aluminum, for example. It is formed by vacuum deposition.

The permanent magnet 106 is bonded to the silicon member 105 by an adhesive. It is polarized in the magnetization direction A.

The actuator 110 is comprised of an electric coil 108 and a core 109.

Here, the driving method of the oscillator in the oscillator device of the present embodiment will be explained. When the electric coil 108 is electrified, a magnetic field is produced in the vicinity of the permanent magnet 106. Then, through the interaction of the magnetic field and the permanent magnet 106, a torque is produced in the oscillator 101 to drive the same.

In the oscillator device 111 of the present embodiment, the oscillator 101 has a natural oscillation mode of torsional oscillation around the torsion axis 104.

This frequency (hereinafter, "resonance frequency") can be presented by:

$$f=1/(2 \cdot \pi) \cdot \sqrt{(2 \cdot K/I)} \quad (1)$$

where K is the torsion spring constant of the torsion spring 102 around the torsion axis 104, and I is the inertia moment of the oscillator 101 around the torsion axis 104.

Furthermore, when the frequency of the alternating current magnetic field to be applied by the actuator 110 is set around the resonance frequency f, oscillation based on the resonance phenomenon is enabled.

Referring next to the flow chart of FIG. 1, the oscillator device manufacturing method of the present embodiment will be explained.

At the first step, for determination of an assumed value of the inertia moment weight of the oscillator, before bonding the permanent magnet 106 to the silicon member 105, for example, the length of the permanent magnet 106 in the magnetization direction A as well as the cross sectional area in the plane perpendicular to the magnetization direction A are measured. Alternatively, the thickness of the wafer is measured.

Here, the subject of measurement may be anyone which is a parameter of the inertia moment I of the oscillator 101, and it is not limited to those described above.

Furthermore, other than the measured value obtained by the measurement in this way, at least one design value, for example, may be used.

At the second step, the resonance frequency f of the oscillator 101 is measured. The measurement method may be, for example, that: a laser beam from a laser (not shown) is reflected by a reflection surface of the oscillator 101 being torsionally oscillated, and the reflected light is received by a beam detector (not shown).

Then, while maintaining the alternating current magnetic field to be applied from the actuator 110 constant, the frequency is changed.

Then, the frequency at the moment whereat the amplitude of the oscillator 101 obtained from the time intervals of light reception becomes largest is the resonance frequency f of the oscillator 101 in the oscillator device 111.

At the third step, the resonance frequency f measured at the second step and the inertia moment I which can be calculated in the following manner are substituted into the aforementioned equation (1), and a spring constant K is calculated.

The inertia moment I can be calculated from the value measured at the first step and another design value constituting the inertia moment I.

In this manner, by calculating the spring constant K using measured values as many as possible, it is enabled to meet manufacture dispersion and to calculate the spring constant K more precisely.

At the fourth step, the inertia moment adjustment amount $\Delta I$ for achieving the target resonance frequency ft is calculated.

Here, the spring constant K calculated at the third step and the target resonance frequency ft are substituted into equation (1), and the target inertia moment It corresponding to the target resonance frequency ft is calculated.

The inertia moment adjustment amount $\Delta I$ can be calculated by:

$$\Delta I = I - It \quad (2)$$

At the fifth step, a portion of the oscillator 101 corresponding to the inertia moment adjustment amount $\Delta I$ as calculated by the fourth step is removed by using a machining laser (not shown), and the frequency is adjusted to the target resonance frequency ft.

The portion of the oscillator 101 to be removed is, for example, the surface which is opposed to the reflection surface.

In that case, before securing the fixed member 103 to the fixed base 107, a portion of the opposed surface may be removed by using a machining laser, so as to adjust the frequency to the target resonance frequency ft.

Figure 3:
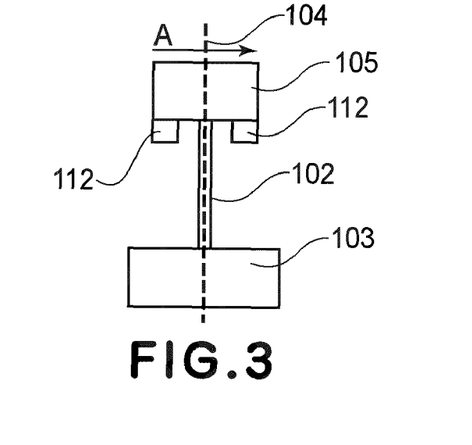
FIG. 3 is a diagram for explaining a structural example in which a protrusion is provided on the oscillator device of the first embodiment of the present invention.

As an alternative, as shown in FIG. 3, if a protrusion 112 is provided on the oscillator 101, then only the protrusion 112 can be removed without damaging the reflection surface. Thus, the target resonance frequency ft can be adjusted even after the fixed member 103 is secured to the fixed base 107.

FIG. 3 is a diagram showing that a protrusion 112 is provided on the oscillator 101 of the oscillator device 111 of FIG. 2.

Here, the inertia moment adjustment amount $\Delta I$ is expressed by:

$$\Delta I = m \cdot l^2 \quad (3)$$

where m is the weight (mass) removed and l is the distance between the torsion axis 104 and the gravity center of the removal portion.

Based on these m and l as determined by equation (3), the amount of removal from the oscillator 101 as well as the position thereof are determined.

After executing the procedure from the first step to the fifth step described above, the second step is performed furthermore and the process of the second steps to the fifth steps is repeated until the difference with the target resonance frequency ft comes to a desired value or less.

In the oscillator device 111 of the present embodiment, the torsion spring 102 has a smaller width in the magnetization direction A as compared with the oscillator 101.

Furthermore, the oscillator 101 and the torsion spring 102 are formed integrally with each other, such that the oscillator 101 and the torsion spring 102 would have the same manufacture dispersion caused during the semiconductor manufacturing process.

Thus, the spring constant K would be influenced more by the manufacture dispersion.

By calculating the spring constant K which is largely influenced by such manufacture dispersion from the measurement result of the frequency f of the natural oscillation mode and the inertia moment I less influenced thereby, an inertia moment adjustment amount ΔI which can meet the manufacture dispersion can be calculated.

As a result of this, high precision adjustment of the resonance frequency is enabled. Furthermore, the number of repetitions of the second step to the fifth step decreases, and thus the production time is shortened.

Here, at the fourth step of FIG. 1, in place of the inertia moment adjustment amount ΔI, the spring constant adjustment amount ΔK may be calculated, and the resonance frequency may be adjusted by removing a portion of the torsion spring 102 with use of a machining laser at the fifth step.

In that occasion, the target resonance frequency ft and the inertia moment I may be substituted into equation (1), and the target spring constant Kt corresponding to the target resonance frequency ft may be calculated.

Based on this, the spring constant adjustment amount ΔK can be calculated in accordance with equation (4) below.

$$\Delta K = K - Kt \quad (4)$$

Furthermore, although in the foregoing description the frequency is adjusted to the target resonance frequency ft by removing a portion of the oscillator 101 or the torsion spring 102, to the contrary, a mass (weight) may be added to a portion of the oscillator 101 or torsion spring 102, thereby to adjust the frequency to the target resonance frequency ft.

The weight adding method may use adhesive application, for example. In that occasion, since no heat is applied to the oscillator device 111, thermal damage of the oscillator device 111 can be prevented.

Furthermore, both of the weight removal method and the weight addition method may be used in combination to adjust the frequency to the target resonance frequency ft. In that case, the resonance frequency can be adjusted by overshooting the target resonance frequency ft. Therefore, the resonance frequency can be adjusted more quickly.

Embodiment 2

The second embodiment will be described with reference to an oscillator device manufacturing method which differs from the first embodiment.

Figure 4A:
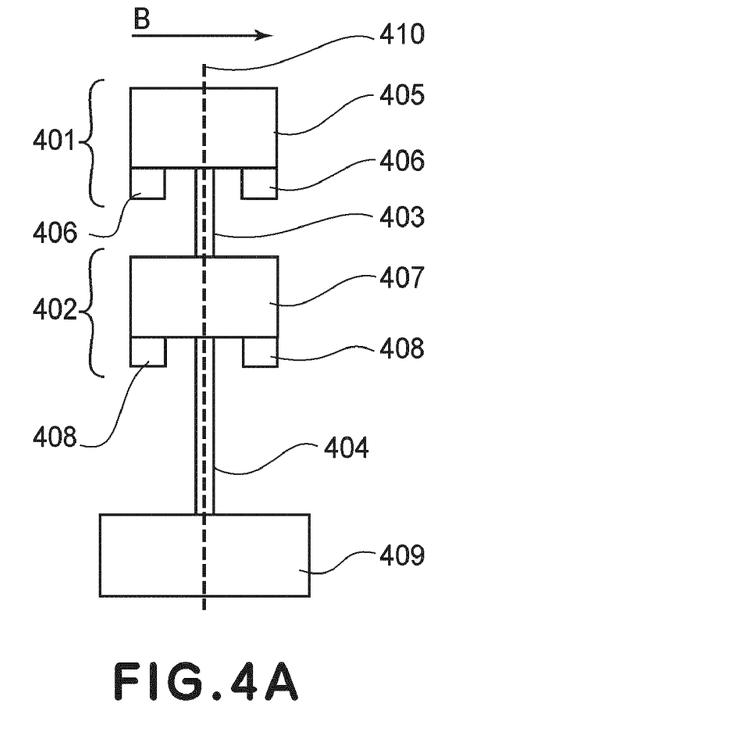
FIG. 4A is a front elevation of an oscillator device of the present embodiment.
Figure 4B:
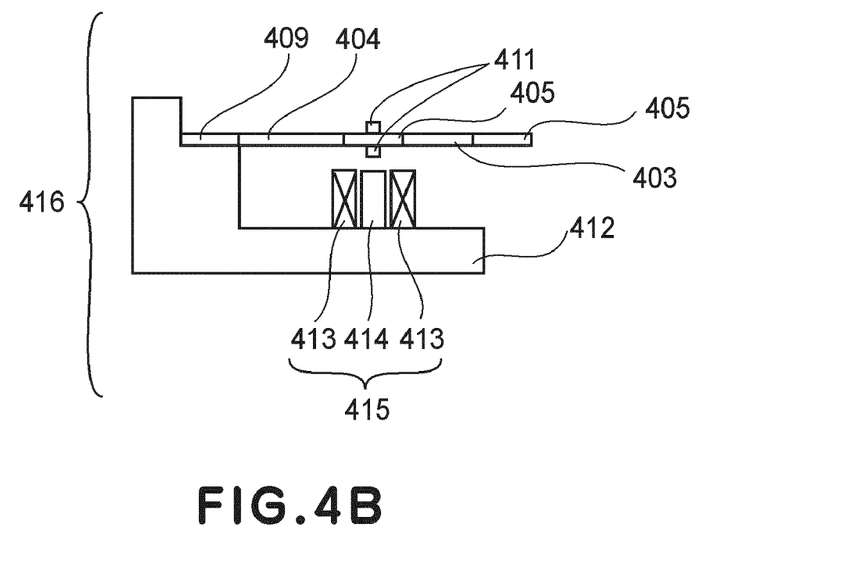
FIG. 4B is a sectional view along a plane passing through a torsion axis and being perpendicular to sheet of the drawing.

FIGS. 4A and 4B are diagrams for explaining the oscillator device manufacturing method of the present embodiment. FIG. 4A is a front elevation of the oscillator device of the present embodiment, and FIG. 4B is a sectional view along a plane passing through a torsion axis 410 and being perpendicular to sheet of the drawing.

In FIGS. 4A and 4B, denoted at 401 is a first oscillator, and denoted at 402 is a second oscillator. Denoted at 403 is a first torsion spring, and denoted at 404 is a second torsion spring. Denoted at 405 is a first silicon member.

Denoted at 406 is a first protrusion, and denoted at 407 is a second silicon member. Denoted at 408 is a second protrusion, and denoted at 409 a fixed member. Dented at 410 is a torsion axis.

Denoted at 411 is a permanent magnet, and denoted at 412 is a fixed base. Denoted at 413 is an electric coil, and denoted at 414 is a core. Denoted at 415 is an actuator, and denoted at 416 is an oscillator device.

In the oscillator device 416 of the present embodiment, the first oscillator 401 is supported at the second oscillator 402 through the first torsion spring 403. The second oscillator 402 is supported at the fixed member 409 through the second torsion spring 404.

The first oscillator 401 is comprised of a first protrusion 406, a reflection surface (not shown) and a first silicon member 405.

The second oscillator 402 is comprised of a second protrusion 408, a permanent magnet 411 and a second silicon member 407.

The permanent magnet 411 is polarized in the magnetization direction B. Here, by fixing the permanent magnet 411 from both sides of the second oscillator 402, the torsion axis 410 and the gravity center of the second oscillator 402 can be aligned with each other, such that creation of an unnecessary mode is avoided or reduced.

The actuator 415 is comprised of an electric coil 413 and a core 414.

Due to the first and second oscillators 401 and 402, the oscillator device 416 has two resonance frequencies f1 and f2 based on the torsional oscillations around the torsion axis 410.

The actuator 415 functions to oscillate the first oscillator 401 and the second oscillator 402 on the basis of a sinusoidal-wave combined driving signal of a reference frequency f0 which is the target resonance frequency and a frequency 2*f0 which is twofold the reference frequency f0.

Figure 9:
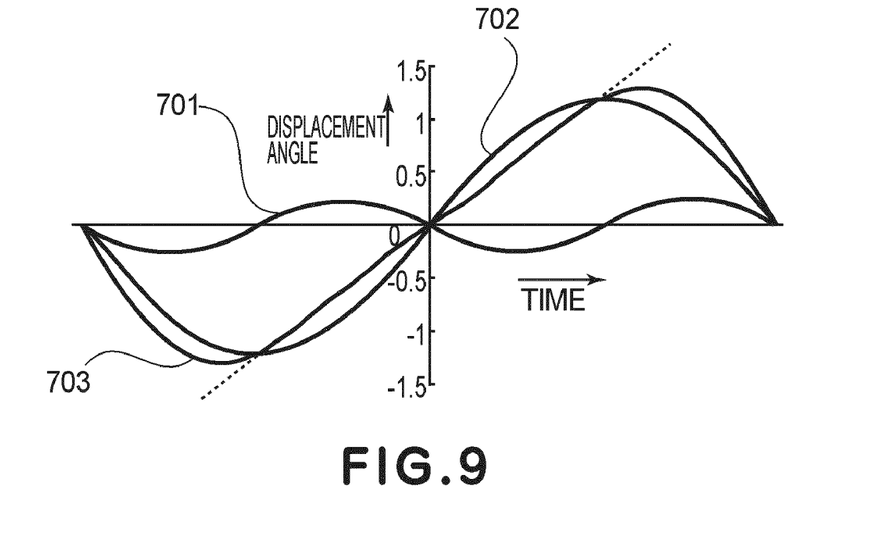
FIG. 9 is a diagram which shows the displacement angle of light scanningly deflected by the oscillator device of the second embodiment of the present invention.

Particularly, if f1 is designed at around f0 and f2 is set around 2*f0, an approximately sawtooth-wave oscillation such as at 703 in FIG. 9 can be realized by adjusting the amplitudes of the two sinusoidal vibrations 701 and 702.

As compared with a case where the wave is a sinusoidal wave, the approximately sawtooth-wave oscillation 703 allows to set the substantially constant angular-speed region much wider. Thus, the available region relative to the whole area of the scanning deflection can be enlarged.

On the other hand, in order to obtain a desired combined waveform as described above, it is necessary to precisely adjust the two resonance frequencies f1 and f2 of the oscillator device 416.

Generally, two resonance frequencies f1 and f2, based on the torsional oscillation of an oscillation system including two oscillators and two torsion springs, are given by equation (5) below.

$$f1 = \sqrt{\frac{I2k1 + I1k2 + I2k2 - \sqrt{-4I1I2k1k2 + (I1k2 + I2(k1 + k2))^2}}{8I1I2\pi^2}} \quad (5)$$

-continued $$f2 = \sqrt{\frac{I2k1 + I1k2 + I2k2 + \sqrt{-4I1I2k1k2 + (I1k2 + I2(k1+k2))^2}}{8I1I2\pi^2}}$$

Here, K1 and K2 are spring constants of the first torsion spring 403 and the second torsion spring 404, respectively, and I1 and I2 are the inertia moments of the first oscillator 401 and the second oscillator 402, respectively.

In this way, as compared with equation (1) of the first embodiment, and equation (5) is a simultaneous equation, with only the variables being increased to a double.

Hence, based on equation (5), the frequency can be adjusted in a similar manner as the first embodiment.

Here, in the oscillator device 416 of the present embodiment, the necessity of making the two resonance frequencies f1 and f2 of the primary resonance frequency and the secondary resonance frequency in an approximately twofold relationship, will be explained. It should be noted that in the present invention the term "approximately twofold" refers to a range from 1.98× to 2.02×. An approximately sawtooth-wave oscillation such as shown in the present embodiment is enabled in this range.

Now, it is assumed that the following relationship is present between f1 and f2.

$$\Delta f = f2 - 2*f1 \quad (6)$$

Here, in order to cause an approximately sawtooth-wave drive of the first oscillator 401, a sinusoidal-wave combined driving signal comprised of the reference frequency f0 which is the target resonance frequency and a frequency 2*f0 which is twofold the reference frequency f0 is applied to the actuator 415.

Figure 5:
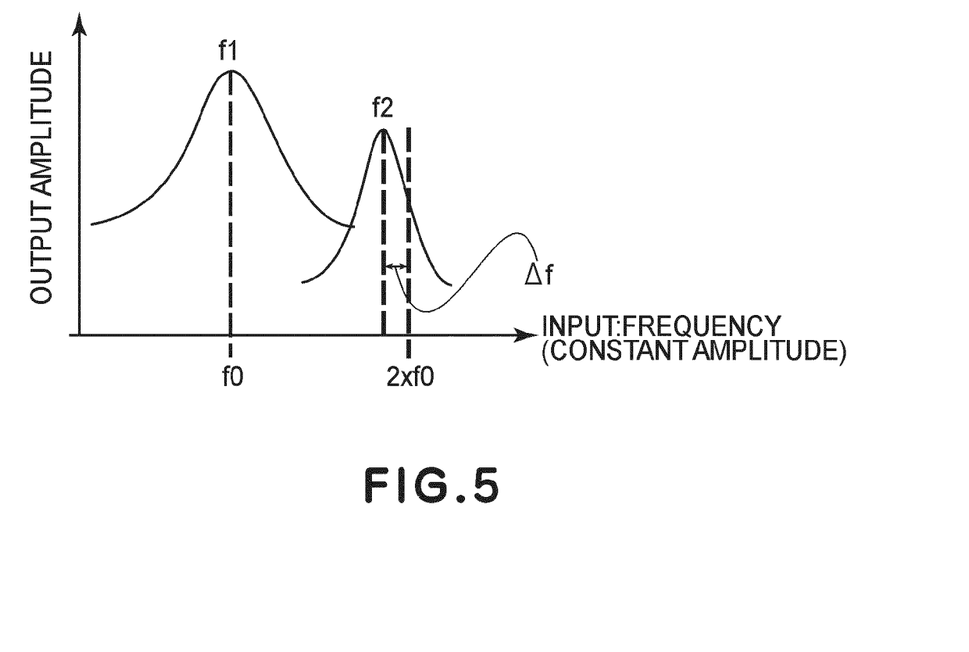
FIG. 5 is a resonance curve graph for explaining the necessity of providing an approximately twofold relationship between two resonance frequencies f1 and f2 in the oscillator device according to the second embodiment of the present invention.

In this case, if f0 is registered with f1, for example, then f2 will deviate from 2*f0 by Δf. FIG. 5 is a diagram of resonance curve illustrating this situation.

In FIG. 5, the axis of abscissas represents the frequency of the sinusoidal-wave driving signal to be applied to the actuator 415. Here, the amplitudes of f1 and f2 are at a constant value, respectively.

On the other hand, the axis of ordinate represents the maximum amplitude when the first oscillator 401 oscillates (torsionally oscillates) in response to an applied driving signal.

Here, when the Q-value of f2 is denoted by Q2 and the amplitude of the sinusoidal-wave driving signal to be added if f2 is equal to 2*f0 is denoted by 1, the driving amplitude P as required when f2 deviates by Δf is given by equation (7) below.

$$\begin{cases} P = Q2\sqrt{(1-\lambda^2)^2 + \left(\frac{\lambda}{Q2}\right)^2} \\ \lambda = \frac{|f2 - \Delta f|}{f2} \end{cases} \quad (7)$$

The oscillator device 416 of the present embodiment uses the resonant oscillation and, in order to obtain efficient driving, the Q-value is set at around 500 to 1500, for example.

Hence, the deviation of Δf largely influences on the driving amplitude. Therefore, it is desirable that Δf is made smallest as much as possible to suppress the driving amplitude, and to attain driving of lower power consumption.

In the oscillator device 416 of the present embodiment as described above, it is a requisite to precisely adjust the two resonance frequencies f1 and f2 into relationship of f0 and 2*f0, respectively.

Embodiment 3

The third embodiment will be described with reference to an oscillator device manufacturing method which differs from the preceding embodiments.

Figure 6A:
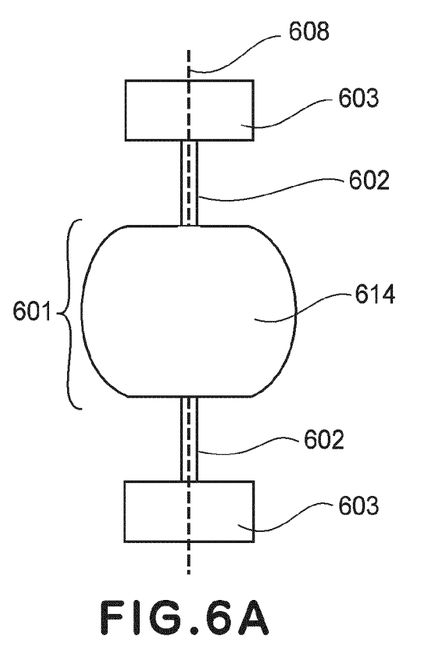
FIG. 6A is a front elevation of the oscillator device of the present embodiment.
Figure 6B:
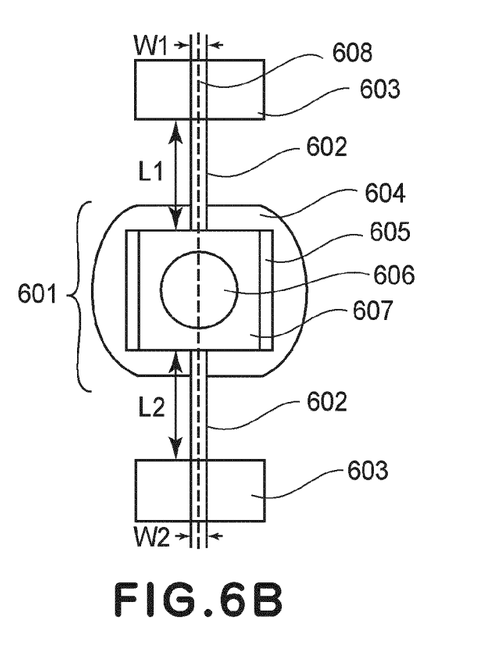
FIG. 6B is a diagram of the device of FIG. 6A as seen from the opposite side.
Figure 6C:
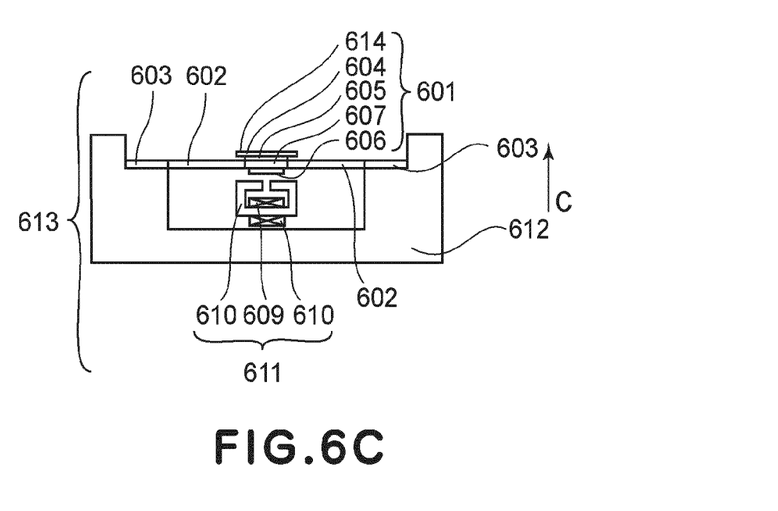
FIG. 6C is a sectional view along a plane passing through a torsion axis and being perpendicular to sheet of the drawing.

FIGS. 6A-6C are diagrams for explaining the oscillator device manufacturing method of the present embodiment. FIG. 6A is a front elevation of the oscillator device of the present embodiment, and FIG. 6B is a diagram of the oscillator device of FIG. 6A as seen from the opposite side. FIG. 6C is a sectional view taken along a plane passing through a torsion axis 608 and perpendicular to the sheet of the drawing.

Figure 7:
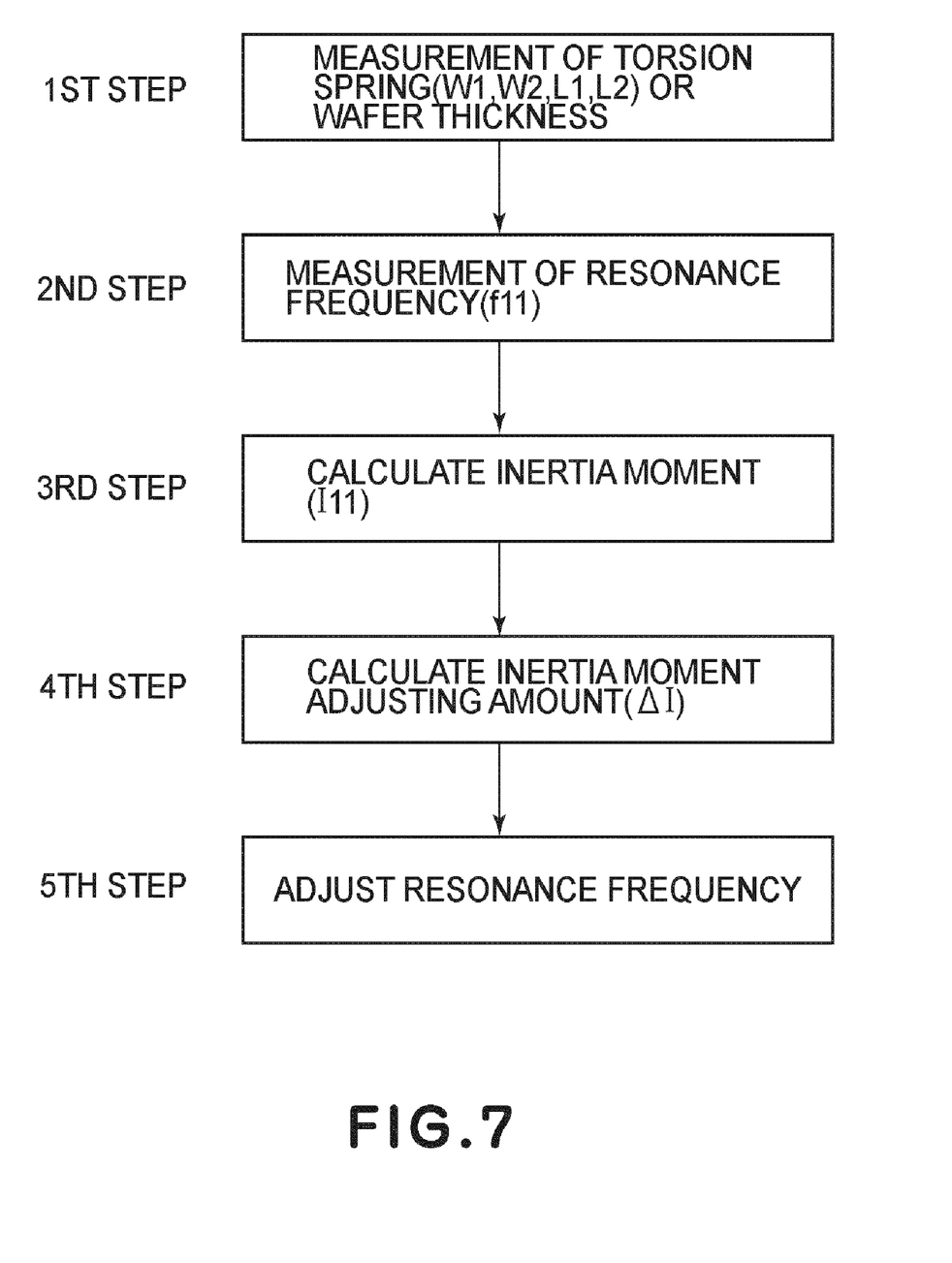
FIG. 7 is a flow chart for explaining an oscillator device manufacturing method according to the third embodiment of the present invention.

Furthermore, FIG. 7 is a flow chart for explaining the oscillator device manufacturing method of the present embodiment.

Denoted in FIG. 6 at 601 is an oscillator, and denoted at 602 is a torsion spring.

Denoted at 603 is a fixed member, and denoted at 604 is a reflector board. Denoted at 605 is a joining board, and denoted at 606 is a permanent magnet. Denoted at 607 is a silicon member, and denoted at 608 is a torsion axis. Denoted at 609 is an electric coil, and denoted at 610 is a core. Denoted at 611 is an actuator, and denoted at 612 is a fixed base. Denoted at 613 is an oscillator device, and denoted at 614 is a reflection surface.

The oscillator device 613 of the present embodiment is comprised of an oscillator 601 which is supported by two fixed members 603 through two torsion springs 602. Furthermore, the two fixed members 603 are supported by a fixed base 612.

The oscillator 601 is comprised of a permanent magnet 606, a joining board 605, a reflector board 604, a reflection surface 614 and a silicon member 607.

The permanent magnet 606 and the joining board 605 are fixed to the silicon member 607 by an adhesive. Furthermore, the reflector board 604 is fixed to the joining board 605 by an adhesive. The reflection surface 614 is formed on this reflector board 604.

The permanent magnet 606 is polarized in the magnetization direction C.

The fixed member 603, the silicon member 607 and the torsion spring 602 are formed integrally, by processing a monocrystal silicon substrate in accordance with photolithography and dry etching of the semiconductor production method.

Here, since the reflection surface 614 is formed on the reflector board 604 of the oscillator 601, the surface flatness thereof at the time of the driving is particularly important. Since it is supported at its opposite ends by means of a pair of torsion springs 602, as compared with a case where it is supported by a single torsion spring, deformation by the self-weight is well reduced and good surface flatness can be maintained.

Furthermore, the reflector board 604 having a reflection surface 614 formed thereon is made while being cemented to the silicon member 607. Thus, even if the reflection area is enlarged to raise the resolution, the silicon member 607 does not need to be enlarged. In other words, a small-sized and a high-resolution optical deflector can be produced.

Furthermore, by choosing the material and size of the joining board 605, the gravity center of oscillator 601 can be easily registered with the torsion axis 608.

The actuator 611 is comprised of a core 610 and an electric coil 609. The orientation of the magnetic field producing by the electric coil 609 and the core 610 differs from that of the oscillator device having been described with reference to the first embodiment. However, the driving method is similar to the first embodiment.

Next, referring to the flow chart of FIG. 7, the oscillator device manufacturing method of the present embodiment will be explained.

At the first step, for determination of an assumed value of the spring constant of the torsion spring, where the lengths of the two torsion springs 602 of FIG. 6 in the direction parallel to the torsion axis 608 are denoted by L1 and L2, respectively, for example, and the lengths upon the monocrystal silicon substrate surface in the direction perpendicular to the torsion axis 608 are denoted by W1 and W2, the widths W1 and W2 and the lengths L1 and L2 of these torsion springs as well as the thickness of the wafer are measured.

Here, the subject of measurement may be anyone which is a parameter of the spring constant of the torsion spring, and it is not limited to those described above.

Furthermore, other than the measured value obtained by the measurement in this way, at least one design value, for example, may be used.

At the second step, the resonance frequency f11 is measured. The measurement method is similar to that in the first embodiment.

At the third step, the frequency f11 of the natural oscillation mode measured by the second step and the spring constant K11 of the torsion spring which can be calculated in the following manner are substituted into a relational expression like equation (1), and the inertia moment I11 of the oscillator 601 is calculated.

The spring constant K11 can be calculated from the value measured by the first step and some other design value constituting the spring constant K11.

In this manner, by calculating the inertia moment I11 using measured values as many as possible, it is enabled to meet manufacture dispersion and to calculate the spring constant K11 more precisely.

At the fourth step, the inertia moment adjustment amount $\Delta I$ for achieving the target resonance frequency ft is calculated.

Here, the spring constant K11 and the target resonance frequency ft are substituted into a relational expression similar to the aforementioned equation (1), and the target inertia moment It is calculated.

With this procedure, the inertia moment adjustment amount $\Delta I$ can be calculated by a relational expression like the aforementioned equation (2).

At the fifth step, a portion of the oscillator 601 corresponding to the inertia moment adjustment amount $\Delta I$ as calculated by the fourth step is removed by using a machining laser (not shown), to adjust the frequency to the target frequency ft.

Here, the fifth step is similar to that of the first embodiment. However, if a protrusion is provided for adjustment of the inertia moment, in the present embodiment, a protrusion 615 may be provided on the joining board 605, for example, as shown in FIG. 8.

Figure 8:
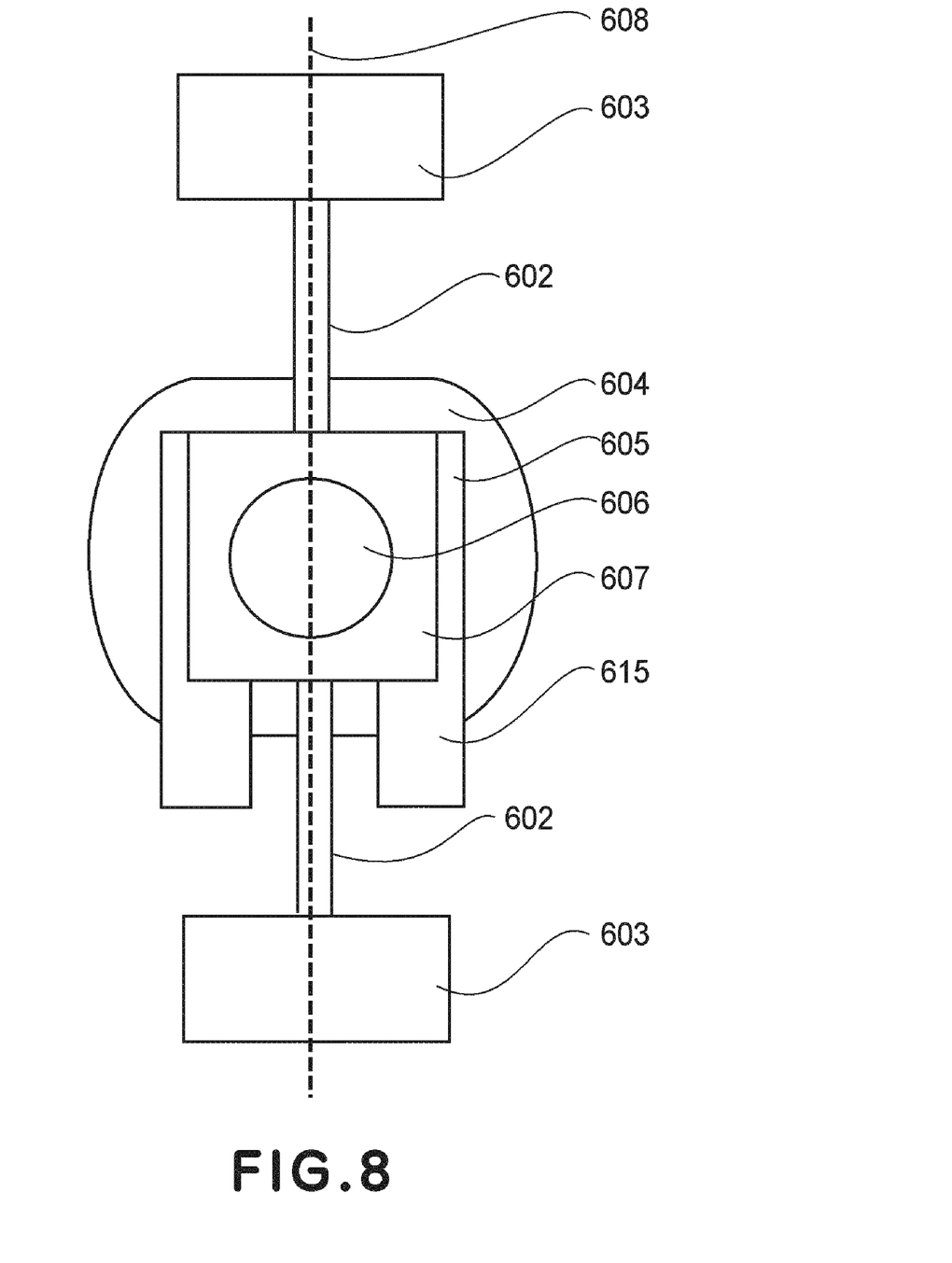
FIG. 8 is a diagram for explaining a structural example in which a protrusion is provided on an oscillator of the oscillator device in the third embodiment of the present invention.

FIG. 8 is a diagram in which the protrusion 615 is provided on the oscillator 601 of the oscillator device 613 shown in FIG. 6.

In the oscillator device 613 of the present embodiment, the oscillator 601 is comprised of a silicon member 607, a permanent magnet 606, a joining board 605 and a reflector board 604.

Since the silicon member is formed integrally with the torsion spring 602, it is precisely disposed to be approximately with respect to the torsion axis 608.

However, the permanent magnet 606, the joining board 605 and the reflector board 604 have to be assembled, and it is practically difficult to install them precisely symmetrically with respect to the torsion axis 608.

Therefore, the inertia moment I11 would be influenced more by the manufacture dispersion, than the spring constant K11 is.

In consideration of this, as in the present embodiment, the inertia moment I11 which is influenced more by the manufacture dispersion is calculated from the spring constant K11 which is less influenced and the measurement result of the resonance frequency f11.

Then, the inertia moment adjustment amount $\Delta I$ which meets the manufacture dispersion can be calculated. Thus, high-precision adjustment of the resonance frequency is enabled.

Furthermore, the number of repetitions of the procedure from the second step to the fifth step decreases, and the production time is shortened.

Here, like the first embodiment, in the fourth step of FIG. 7, in place of the inertia moment adjustment amount $\Delta I$, the spring constant adjustment amount $\Delta K$ may be calculated and the resonance frequency may be adjusted by removing a portion of the torsion spring 602 by using a machining laser, at the fifth step.

Embodiment 4

The fourth embodiment will be described with reference to a structural example of an optical instrument using an optical deflector which is comprised of an oscillator device according to the present invention.

Here, and image forming apparatus is shown as an optical instrument.

Figure 10:
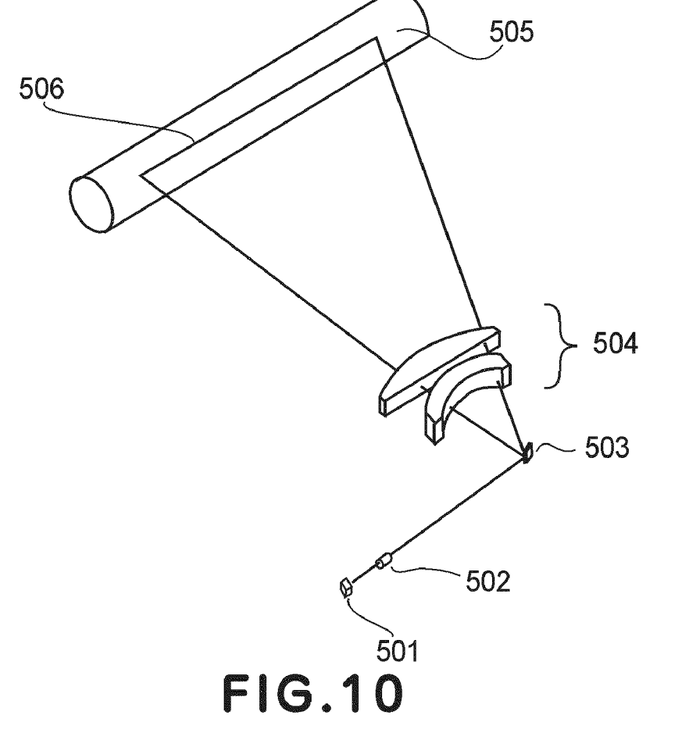
FIG. 10 is a perspective view for explaining the structure of an image forming apparatus in a fourth embodiment of the present invention.

FIG. 10 is a schematic and perspective diagram for explaining the structural example of an image forming apparatus according to the present embodiment.

In FIG. 10, denoted at 501 is a laser source, and denoted at 502 is a lens or lens group. Denoted at 503 is an optical scanning system, and denoted at 504 is a writing lens or lens group. Denoted at 505 is a photosensitive member, and denoted at 506 is a scan locus.

The image forming apparatus of the present embodiment includes a light source, a photosensitive member and an optical deflector which has an optical deflecting element disposed on an oscillator and is comprised of an oscillator device of the present invention.

Light from the light source is deflected by the optical deflector, and at least a portion of the light is incident on the photosensitive member.

More specifically, as shown in FIG. 10, the input light is one-dimensionally scanned by means of an optical scanning system (oscillator device) 503 which is comprised of an oscillator device according to any one of the preceding embodiments of the present invention. Through the writing lens 504, the scanning laser beam forms an image is upon the photosensitive member 505.

The photosensitive member 505 is being uniformly charged by a charging device (not shown). When the photosensitive member surface is scanned with light, an electrostatic latent image is formed on the portion scanned by the light.

Subsequently, a toner image is formed on the imagewise portion of the electrostatic latent image, by means of a developing device (not shown). The toner image is transferred to and fixed on a paper sheet (not shown), whereby an image is produced on the paper sheet.

In this procedure, by means of the optical scanning system (oscillator device) 503 which is comprised of an oscillator device according to any one of the preceding embodiments, the angular speed of the scanning deflection of the light can be made approximately constant within a specified range.

Although in the foregoing description the invention has been explained with reference to examples of image forming apparatus as an optical instrument, the present invention is not limited to such structure.

For example, it may include a light source, an image display and an optical deflector which is comprised of an oscillator device of the present invention, and a projection display device may be constituted thereby, arranging so that light from the light source is deflected by the optical deflector and is incident on the image display.

Thus, in accordance with an oscillator device of the present invention, an oscillator device suitable for various optical instruments including a projection display for projecting an image by the scanning deflection of the light and an image forming apparatus such as a laser beam printer or a digital copying machine having an electrophotographic process, can realized.

The invention claimed is:

1. A method of manufacturing an oscillator device having a plurality of oscillators supported relative to a fixed member by a plurality of torsion springs for oscillation around a torsion axis and arranged to be driven at respective resonance frequencies, said method comprising:
   a first step for determining assumed values of respective inertia moment weights of the oscillators;
   a second step for measuring the resonance frequencies;
   a third step for calculating respective spring constants of the torsion springs, from the assumed values of the inertia moment weights and the measured resonance frequencies obtained at said first and second steps;
   a fourth step for calculating an adjustment amount for the inertia moment weights corresponding to the plurality of oscillators or for the spring constants corresponding to the plurality of torsion springs, based on the spring constants calculated at said third step and target resonance frequencies determined with respect to the resonance frequencies of the plurality of oscillators, so as to adjust the resonance frequencies to the target resonance frequencies; and
   a fifth step for adjusting the resonance frequencies of the plurality of oscillators to the target resonance frequencies based on the calculated adjustment amount.

2. A method according to claim 1, wherein the first and second oscillators are adjusted to be able to oscillate around the torsion axis, based on a primary resonance frequency which is the target resonance frequency and a secondary resonance frequency having a frequency approximately twofold the target resonance frequency.

3. A method according to claim 1, wherein the assumed value of the inertia moment weight of each oscillator is determined by at least one design value or by at least one design value and at least one measured value.

4. A method according to claim 3, wherein the oscillators, the torsion springs and the fixed member are formed integrally by use of monocrystal silicon, and wherein the at least one measured value includes at least one of measured values concerning (i) a thickness of the monocrystal silicon, (ii) a cross-sectional area of the oscillator perpendicular to the thickness direction of the monocrystal silicon, (iii) a length of a permanent magnet in a magnetization direction thereof, the permanent magnet being adhered to drive the oscillator formed by the monocrystal silicon, and (iv) a cross-sectional area of the permanent magnet perpendicular to the magnetization direction.

5. An optical deflector, comprising:
   an oscillator device manufactured in accordance with an oscillator device manufacturing method as recited in claim 1; and
   an optical deflecting element disposed on at least one of the oscillators of said oscillator device.

6. An optical instrument, comprising:
   a light source;
   a photosensitive member or an image display member; and
   an optical deflector as recited in claim 5,
   wherein said optical deflector is configured to deflect light from said light source so that at least a portion of the light is incident on said photosensitive member or said image display element.

7. A method of manufacturing an oscillator device having a plurality of oscillators supported relative to a fixed member by a plurality torsion springs for oscillation around a torsion axis and arranged to be driven at respective resonance frequencies, said method comprising:
   a first step for determining assumed values of respective spring constants of the torsion springs;
   a second step for measuring the resonance frequencies;
   a third step for calculating respective inertia moment weights of the oscillators, from the assumed values of the spring constants of the torsion springs and the measured resonance frequencies obtained at said first and second steps;
   a fourth step for calculating an adjustment amount for the inertia moment weights corresponding to the plurality of oscillators or for the spring constants corresponding to the plurality of torsion springs, based on the inertia moment weights corresponding to the plurality of oscillators calculated at said third step and target resonance frequencies determined with respect to the resonance frequencies of the plurality of oscillators, so as to adjust the resonance frequencies to the target resonance frequencies; and
   a fifth step for adjusting the resonance frequencies of the plurality of oscillators to the target resonance frequencies based on the calculated adjustment amount.

8. A method according to claim 7, wherein the assumed value of the spring constant of each torsion spring is determined by at least one design value or by at least one design value and at least one measured value.

9. A method according to claim 8, wherein the oscillators, the torsion springs and the fixed member are formed integrally by use of monocrystal silicon, and wherein the at least one measured value includes at least one of measured values concerning (i) a thickness of the monocrystal silicon, (ii) a length of the torsion spring in a direction perpendicular to the torsional axis, and (iii) a length of the torsion spring in a direction parallel to the torsional axis.

10. A method according to claim 7, wherein the first and second oscillators are adjusted to be able to oscillate around the torsion axis, based on a primary resonance frequency which is the target resonance frequency and a secondary resonance frequency having a frequency approximately twofold the target resonance frequency.

* * * * *